G. Heffner,
Harrow.
No. 87,845. Patented Mar. 16, 1869.
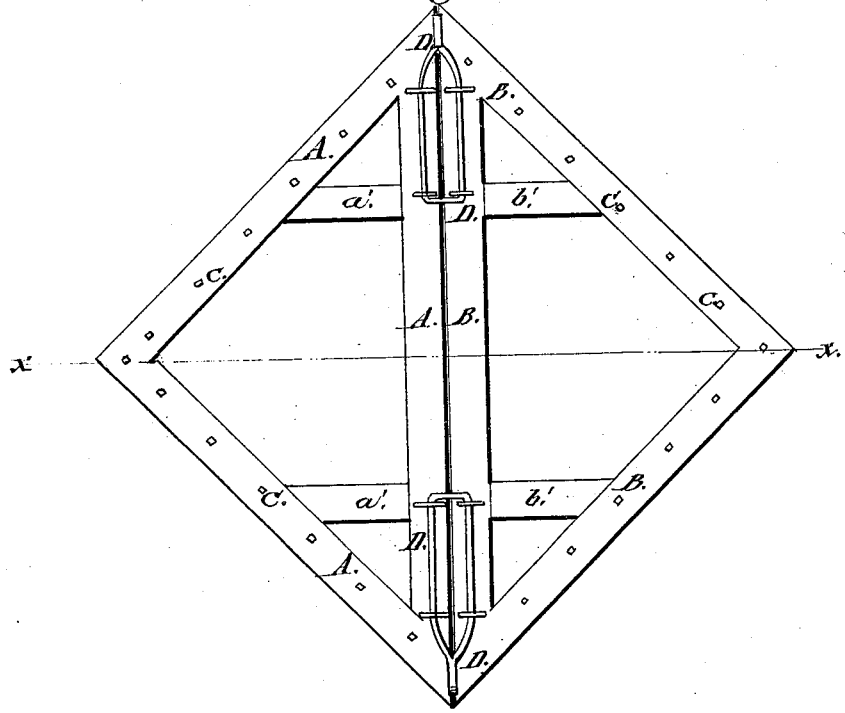
Witnesses:
C. Raettig
Wm A. Morgan
Inventor:
G. Heffner

GEORGE HEFFNER, OF HOMER, IOWA.

Letters Patent No. 87,845, dated March 16, 1869.

IMPROVEMENT IN HARROWS.

The Schedule referred to in these Letters Patent and making part of the same

*To all whom it may concern:*

Be it known that I, GEORGE HEFFNER, of Homer, in the county of Hamilton, and State of Iowa, have invented a new and improved Harrow; and I do hereby declare that the following is a full, clear, and exact description thereof, which will enable others skilled in the art to make and use the same, reference being had to the accompanying drawings, forming part of this specification, in which—

Figure 1 is a vertical section of my improved harrow, taken through the line x x, fig. 2.

Figure 2 is a top view of the same.

Similar letters of reference indicate corresponding parts.

My invention has for its object to furnish an improved harrow, which shall be so constructed, that each part may be lifted, to clear it of rubbish, without stopping the team, and which will adapt itself to the form of the ground to be harrowed, so that no part of the ground may be left unharrowed; and It consists in the harrow, constructed as hereinafter more fully described.

The frame of the harrow is made in two parts, A and B, which are exactly alike in size, shape, and construction.

The parts, A and B, are made triangular in shape, and are strengthened by short cross-bars, or beams, a' and b', as shown in fig. 2.

C are the harrow-teeth, which are passed through the outer arms, or beams of the triangular frames, and are so arranged, that no two of them may travel in the same track, when the harrow is drawn forward.

D are the draught-hooks, which are made in the form shown in figs. 1 and 2; that is to say, their shanks are spread and slotted, or made in the form of a link, as shown in fig. 3.

The slotted parts of the hooks D are secured to the central or diagonal beams of the two frames A and B, near their ends, by staples, eye-bolts, or other similar means, so that each part of the harrow may be raised, to clear it of rubbish, without disturbing the position of the other part, or of the draught-hooks D.

The two hooks D are both connected with the harrow, with their hooked ends outward, or toward the angles of the harrow-frame, as shown in fig. 2, so that the draught may be applied with equal facility to either angle of the harrow.

By this arrangement, when the teeth C become worn upon one side, the draught may be attached to the other angle, so as to wear the other side of the said teeth, thus making the teeth self-sharpening.

Having thus described my invention,

I claim as new, and desire to secure by Letters Patent—

1. An improved harrow, formed by the combination of the triangular frames A B, draught and connecting-hooks D, and teeth C, with each other, said frames and hooks being constructed and arranged substantially as herein shown and described, and for the purposes set forth.

2. The draught and connecting-hooks D, constructed as described, when used in connection with the triangular frames of the harrow, substantially as herein shown and described, and for the purpose set forth.

GEORGE HEFFNER.

Witnesses:
B. F. DERR,
WM. H. JAMESON.